117920 — PATENTED AUG 8 1871
LEMUEL R. PALMER.
STAVE MACHINE.
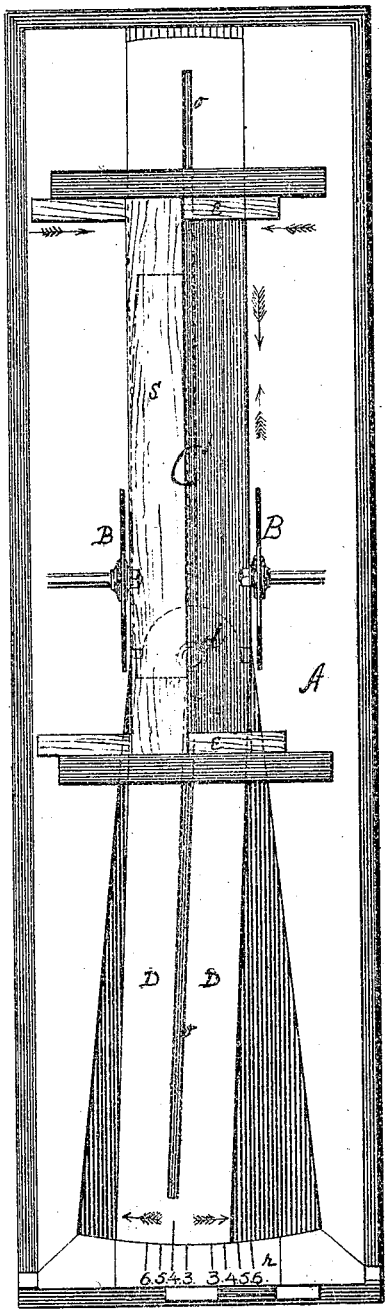
Fig. I.
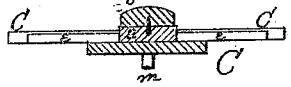
Fig. IV.
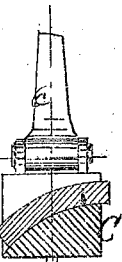
Fig. V.
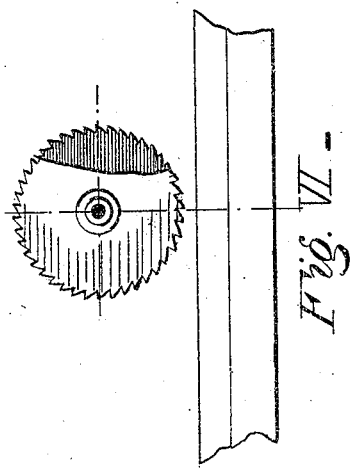
Fig. VI. — Fig. III.
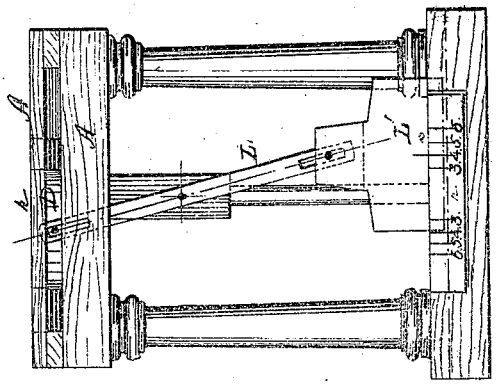
Fig. II.
Witnesses:
C. F. Brown
W. F. Henderson
Inventor:
Lemuel R. Palmer
By Hill & Ellsworth
Attys.

UNITED STATES PATENT OFFICE

LEMUEL R. PALMER, OF BELFAST, MAINE.

IMPROVEMENT IN STAVE-JOINTERS.

Specification forming part of Letters Patent No. 117,920, dated August 8, 1871.

*To all whom it may concern:*

Be it known that I, LEMUEL R. PALMER, of Belfast, in the county of Waldo and State of Maine, have invented a Stave-Machine; and I do hereby declare the following to be a full, clear, and exact description of the same, reference being had to the accompanying drawing forming part of this specification, in which—

Figure 1 is a top view; Fig. 2, an end elevation; Fig. 3, a top view of one form of carriage; Fig. 4, a cross-section of another form of carriage; Fig. 5, a cross-section of the carriage shown in Fig. 3; and Fig. 6, a side view, showing one arrangement of the saws.

Similar letters of reference in the accompanying drawing denote corresponding parts.

In the manufacture of staves for barrels it is important that the taper of the staves, from the middle to the ends, shall vary directly according to their width; otherwise, a barrel composed of wide staves will have less bilge than one of the same dimensions composed of narrow staves, and the difference in bilge thus produced will not only affect the shape, but vary the capacity of the barrel. I propose to manufacture staves in such a manner that the taper of each one, from the middle to either end, shall be proportioned to the width of stave; and the object of my invention is to provide for public use a machine capable of sawing or jointing staves with any desired taper, and of being readily and conveniently changed and adjusted so as to saw at any other bevel or taper that may be required, according to the varying thickness of the log or the stave. To this end the invention consists in the employment of a laterally-adjustable guide or way, in connection with a longitudinally-moving carriage, and in the details of construction, substantially as hereinafter set forth.

In the drawing, A is the saw-table, supported in any suitable manner, and B B are the saws, which may be arranged, one or more to each table, opposite to each other, as shown. C is the carriage, which may be provided with a clamping-handle, c, adapted at once to the convenient moving of the carriage back and forth by hand, and to the holding of the stave s in place, as shown in Figs. 3 and 5, or which may be provided with a laterally-adjustable plate or supporting-platform, e, as represented in Figs. 1 and 4. This carriage, thus constructed, and provided with means for adjusting and holding the stave, and for being conveniently moved longitudinally, has two pins, m m, projecting down from its under side into a guide-groove, o, in the table beneath, by which its forward and backward movements are perfectly controlled. Said guide-groove is preferably made in two parts, one in the rigid table itself and the other in a horizontal plate, D, pivoted at d, near the center of the table, so that its opposite end will swing in the arc of a circle. The plate D is, of course, countersunk in the table so as to be flush with its upper surface, and the bed in which it rests is formed so as to allow it to swing as far as may be necessary for the purpose. A lever, L, operated by hand or foot, and weighted, if necessary, may be used to swing the plate D to the required position, and a scale, r, may be applied to the surface or end of the table to indicate the precise bevel or taper given to the stave by different adjustments of the carriage.

I have only described one of many obvious ways of connecting the carriage to the table and to the adjustable plate D, but whether the groove be made in the table and plate, and the pins attached to the carriage, or vice versa, or whether any other means be used for swinging the carriage round more or less as it moves back and forth, I regard it all as within the limits of my invention.

After the above description it is hardly necessary to detail the operation of the machine, which will be obvious to every one, it being only necessary to place the stave properly on the carriage and cause the latter to move in a greater or lesser curve by swinging the guide-plate D to the right or left. The saws being arranged on opposite sides of the table to cut in opposite directions, the stave can be jointed on one side by a forward movement, and on the other side by the return movement of the carriage.

If preferred, both ends of the guide-track could be made to swing simultaneously, two swinging plates, D, being employed, and being suitably connected by gears or rods; but such arrangement will increase the complexity and cost of the machine without securing any such additional advantage as will adequately compensate therefor. It may be found best, however, to provide the lever L with a weight, L', or springs, or some equivalent device, for the purpose of swinging the guide-plate D to the center, and causing the carriage to run in straight lines when not forced by the attendant to run otherwise; and a pin or other means may be used for locking the guide in place so that it cannot swing, when this is deemed necessary.

Having thus described my invention, what I claim as new therein, and desire to secure by Letters Patent, is—

1. The swinging guide-plate D, in combination with the carriage, when constructed and operating substantially as and for the purpose specified.

2. The carriage C provided with the clamping-handle $c$, and the laterally-adjustable platform $e$, substantially as and for the purpose set forth.

3. The combination of the lever L, swinging guide-plate D, and the carriage and saw, substantially as and for the purpose described.

LEMUEL R. PALMER.

Witnesses:
E. B. PALMER,
W. S. BRAGG.